March 26, 1957     O. LEWIS     2,786,503
FRUIT AND VEGETABLE CUTTER AND GRATER
Filed April 12, 1954
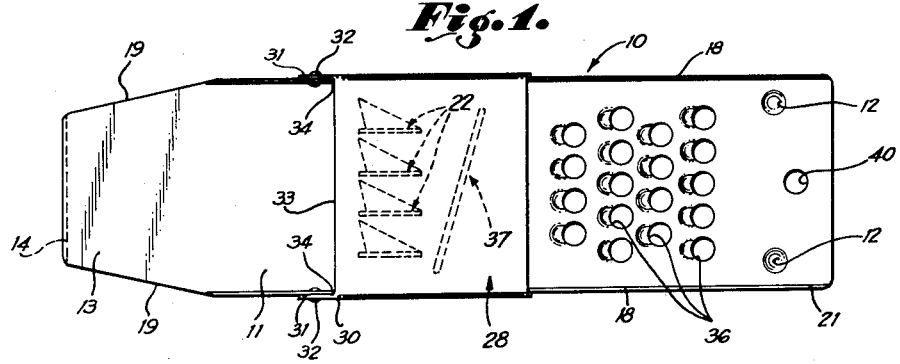
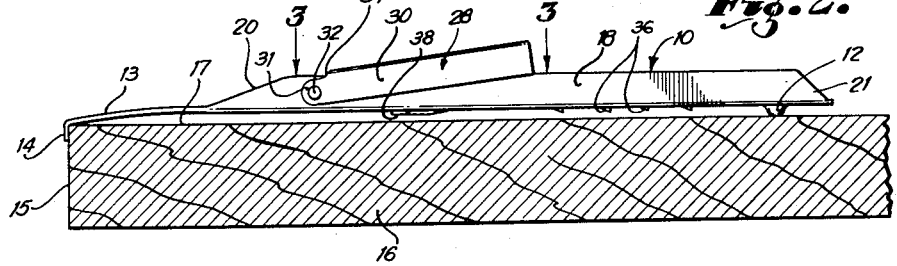
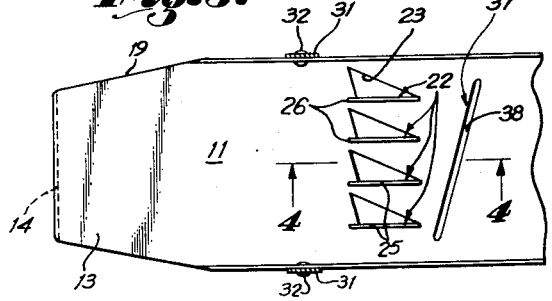
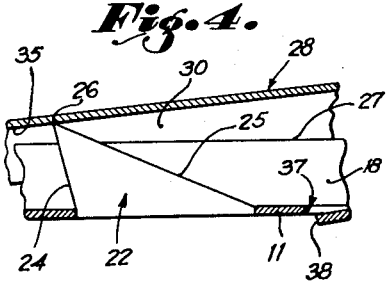
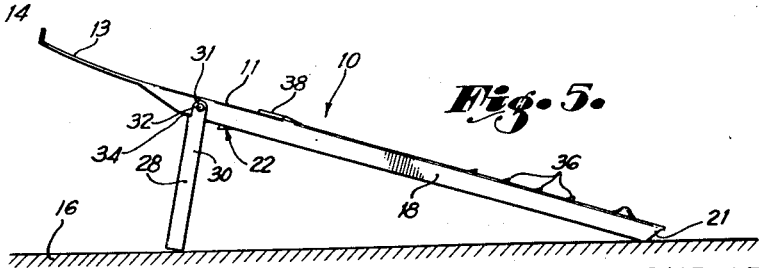
OSCAR LEWIS,
INVENTOR.
AGENT.

United States Patent Office 2,786,503
Patented Mar. 26, 1957

2,786,503

FRUIT AND VEGETABLE CUTTER AND GRATER

Oscar Lewis, Los Angeles County, Calif.

Application April 12, 1954, Serial No. 422,426

4 Claims. (Cl. 146—171)

The present invention relates generally to a kitchen utensil and relates more specifically to a combination kitchen utensil that is adapted for use in preparing various types of food products and/or vegetables, and for cutting such foods into predetermined shapes.

Heretofore, various attempts have been made toward the conception of various types of kitchen utensils that may be used for slicing and/or cutting such foods, as for example, potatoes or the like, and thereby preparing such foods for cooking or utilization in various other food combinations. Prior devices designed for use in situations similar to that of the present invention, have been relatively expensive in both manufacture and ultimate sale, have been complex in structure, have often been unreliable and ineffective in use and have been possessed with many sharp cutting edges arranged in such a manner as to make use of the devices dangerous for the user thereof. Additionally, such prior arrangements and devices have failed to provide for the multiple function necessary for complete and efficient utilization in connection with any of a variety of food products.

It is accordingly an important object of the present invention to provide a combination kitchen utensil for use in preparing various types of foods and for cutting such foods in predetermined shapes.

It is another object of the present invention to provide a kitchen utensil that may be used to provide elongated portions of foods that are square in cross section and which thereafter may be cooked or otherwise prepared for table use.

It is a further object of the present invention to provide a combination kitchen utensil wherein various operative portions thereof are utilized in combination with other portions or cutting arrangements to provide a composite and compact kitchen cutting utensil.

It is a still further important object of the present invention to provide a novel kitchen utensil having novel details of construction surrounding the establishment of various types of cutting arrangements and wherein multipurpose components are utilized with the various cutting arrangements.

It is still another important object of the present invention to provide a kitchen utensil for use in cutting foods to predetermined shapes that is economical in manufacture and ultimate sale, reliable in operation, efficient in use and rugged in construction.

Other and further important objects of the present invention will become apparent from the disclosures in the following detailed specification, appended claims and accompanying drawing, wherein:

Fig. 1 is a top plan view of the kitchen utensil of the present invention;

Fig. 2 is a side elevational view of the kitchen utensil shown in connection with a suitable support shown in section;

Fig. 3 is a fragmentary view partially in section, showing the cutting arrangement as taken substantially as indicated by line 3—3, Fig. 2;

Fig. 4 is an enlarged fragmentary sectional view through some of the cutting arrangements as taken substantially as indicated by line 4—4, Fig. 3; and Fig. 5 is a side elevational view on a reduced scale and showing the present utensil in position for further cutting operations.

With reference to the drawing wherein like characters denote like parts, the kitchen utensil of the present invention is shown as indicated generally at 10. As shown primarily in Figs. 1 and 2, the utensil 10 comprises an elongated base 11 that may be formed from sheet material or the like. One end of the base 11 is provided with a pair of detents 12 that extend below the base, while the other end 13 of the base is downwardly curved, the end thereof being provided with a downwardly directed lip portion 14. The base 11 is provided with elongated upwardly directed side portions 18 that are bent upwardly at substantially a right angle to the base 11 and extend throughout a portion of the length of the base, the base being tapered as at 19, thus terminating the side portions 18 in the positions shown in Figs. 1 and 2. The ends of the side portions 18 may be beveled as at 20 and 21, in order to reduce the sharp edges and corners thereof and to serve in a function to be hereinafter more fully described.

A plurality of triangularly shaped blades 22, Fig. 3, are formed upwardly from the base 11, thus leaving triangular openings 23. As shown primarily in Fig. 4, the blades 22 are each provided with a leading edge 24 that is disposed at a slight angle to the normal of the base 11 and have a trailing portion 25 that tapers toward the base 11. An apex 26 is thus formed on each of the blades 22, this apex extending above a plane which would interconnect the upper surfaces 27 of the side portions 18, this particular arrangement of the blades 22 being for a purpose to be hereinafter more fully described.

As shown primarily in Figs. 1, 2 and 4, a combination cutter and guide member 28 is positioned above the apexes 26 of the blades 22. The guide member 28 has downwardly extending side portions 30 with rearwardly directed tabs 31 which are pivotally secured to the side portions 18 as by rivets 32 or the like. The guide member 28 has a rearwardly directed cutting edge 33 that is positioned in spaced relationship to the transverse axis of the rivets 32, a junction point 34 intermediate the cutting edge 33 and the tabs 31 providing a stop means for limiting rotation of the guide member 28 about the rivets 32. The guide member 28 is adapted normally to be disposed at an angle to the base 11, as shown in Fig. 2, and, as shown in Fig. 4, an inwardly directed surface 35 of the guide member is adapted to contact the apexes 26 of the blades 22.

In normal use of the invention for preparing foods such as potatoes or the like for later cooking, the utensil 10 is placed upon the support 16 with the lip 14 overlapping the end 15 of the support. The guide member 28 is placed in the position shown in Figs. 1, 2, 3 and 4 and the potato is passed over the surface of the end 13 of the base 11 and against the cutting edge 33 of the support 28. The portion of the potato lying between the cutting edge 33 and the surface of the base 11 will be severed by the cutting edge 33 from the balance of the potato with this substantially rectangular portion being thereafter forced into the leading edges 24 of the blades 22. This action will cut the beforementioned rectangular portion of the potato into elongated portions that are substantially square in cross section, with these sections passing out beneath the guide 28. It is to be specifically noted that the portion of the potato remaining above the guide member 28, as the lower portion is forced into the blades 22, will bear against the upper surface of the guide member 28, thus rigidly forcing surface 35 of the guide member into constant contact with the apexes 26 of the blades 22. Inasmuch as only a single contact is presented from each of the blades 22 with respect to the surface 35, a cut will be made vertically to the rectangularly cut portion of the potato and all the way through this portion while still permitting the guide member 28 to be removed from the blades 22 for later cleaning and further utilization as will be hereinafter more fully described.

It is to be noted that the specific construction and arrangement of the present invention is such as to eliminate the necessity for sharp edges thereon as may be utilized for cutting or the like; however, it is to be understood that the edges of the blades 22, together with the cutting edge 33 of the guide member 28, may be sharpened if such is desired. It is also to be noted that the leading edges 24 of the blades 22 are disposed at an angle other than 90° to the base 11, thus to render such cutting edges more effective in severing the square portions from the rectangular portions of the potato.

It is also to be noted and understood that, while the present invention has been described as being applied to potatoes or the like, that other types of vegetables or other food products may be utilized with the present invention.

With reference primarily to Fig. 5, it is to be noted that the present invention may be utilized for other purposes by utilizing the combination support and guide member 28 as a stand for supporting the utensil 10 at an angle to the support 16. In this instance, the other end of the utensil 10 is adapted to rest on the beveled portions 21 of the side members 18. When the utensil is disposed in the position shown in Fig. 5, a plurality of grating type individual cutters 36, formed outwardly from the base in a direction opposite from the direction of the blades 22 may be employed for grating or shredding the food products.

It is to be noted that the stop corners 34 limit movement of the guide member 28 about the rivets 32 in order that the utensil may be supported in rigid position as shown in Fig. 5.

In order that the present invention may be utilized for slicing food products, and in order that complete utilization may be made of the utensil, a shaving type cutter 37 is formed through the base 11 adjacent the trailing edges of the blades 22 and intermediate the blades 22 and the plurality of cutters 36. This shaving cutter has a cutting edge 38, formed in a direction outwardly from the base 11 and opposite from the direction of the blades 22. The cutting edge 38 faces toward the end 13 of the base 11, thus to enable use thereof without interference from the plurality of cutters 36.

It is thus to be noted that there has been provided a utilitarian type of kitchen utensil that is relatively economical in manufacture, efficient in operation and reliable in use, and which may be easily cleaned following use thereof. It is to be noted that the device may be placed in a drawer with other kitchen utensils without damage thereto or may be, if desired, hung from a wall hook as by an opening 40 formed through one end of the base 11.

Having thus described the invention and the present embodiment thereof, it is desired to emphasize the fact that many modifications may be resorted to in a manner limited only by a just interpretation of the following claims.

I claim:
1. A kitchen utensil, for use in cutting foods into elongated portions substantially square in cross section, comprising: an elongated base; a pair of side portions formed at right angles upwardly from said base; a plurality of triangularly shaped blades formed upwardly from said base, said blades having apexes disposed beyond a plane interconnecting outer edges of said side portions; a guide; side portions on said guide and extending over said side portions of said base; and pivot means between said guide and said base side portions, said guide having an inwardly directed transverse surface adapted for engagement with said apexes of said blades whereby, when said foods are passed thereover and across said blades, to permit constant pressure on said surface and contact thereof with said apexes.

2. A kitchen utensil, for use in cutting foods into elongated portions substantially square in cross section, comprising: an elongated base; a pair of side portions formed at right angles upwardly from said base and extending along a portion of the length thereof; a plurality of triangularly shaped blades formed upwardly from said base, said blades having apexes disposed beyond a plane interconnecting outer edges of said side portions; a combination guide and transverse cutter; side portions on said guide and extending over said side portions of said base; and pivot means between said guide and said base side portions, said guide having an inwardly directed transverse surface adapted for engagement with said apexes of said blades whereby, when said foods are passed thereover and across said blades, to permit constant pressure on said surface and contact thereof with said apexes.

3. A kitchen utensil, for use in cutting foods into elongated portions substantially square in cross section, comprising: an elongated base; a pair of side portions at right angles upwardly from said base and extending along a portion of the length thereof; a plurality of triangularly shaped blades formed upwardly from said base, said blades having apexes disposed beyond a plane interconnecting outer edges of said side portions; a combination guide and transverse cutter; side portions on said guide and extending over said side portions of said base; pivot means between said guide and said base side portions, said guide having an inwardly directed transverse surface adapted for engagement with said apexes of said blades whereby, when said foods are passed thereover and across said blades, to permit constant pressure on said surface and contact thereof with said apexes; and a lip formed on one end of said base, and adapted for engagement with a support, for holding said utensil against longitudinal movement.

4. A combination kitchen utensil for cutting foods into predetermined shapes comprising, in combination: an elongated base; detent support means carried by and for one end of said base; a downwardly curved portion on another end of said base; a lip formed on the end of said downwardly curved portion, said lip adapted for engagement with a support for holding said utensil against longitudinal movement, said downwardly curved portion cooperating with said support means to dispose said utensil above said support; side portions disposed substantially normal along sides of said base; a plurality of triangularly shaped blades spaced across said base and disposed therefrom in the direction of said side portions; a guide, said guide having a cutting edge and a transverse surface, said surface being adapted for engagement with apexes of said blades; and pivot means mounted on said side portions for removably mounting said guide relative to said blades.

References Cited in the file of this patent
UNITED STATES PATENTS 2,261,743    Murcic  _____ Nov. 4, 1941
2,447,714    Richards  _____ Aug. 24, 1948